US00RE44092E

(19) United States
(12) Reissued Patent
Kim et al.

(10) Patent Number: US RE44,092 E
(45) Date of Reissued Patent: Mar. 19, 2013

(54) APPARATUS AND METHOD FOR ADAPTIVELY MODULATING SIGNAL BY USING LAYERED TIME-SPACE DETECTOR USED IN MIMO SYSTEM

(75) Inventors: Young-Doo Kim, Seoul (KR); Inhyoung Kim, Yongin-si (KR); Heejung Yu, Daejeon (KR); Jihoon Choi, Seoul (KR); Taehyun Jeon, Sungnam (KR); Jae-Young Ahn, Daejon (KR); Yong-Hoon Lee, Daejeon (KR)

(73) Assignee: Electronics and Telecommunications Research Institute, Daejon (KR)

(21) Appl. No.: 12/949,425

(22) Filed: Nov. 18, 2010

Related U.S. Patent Documents

Reissue of:
(64) Patent No.: 7,453,947
Issued: Nov. 18, 2008
Appl. No.: 10/737,398
Filed: Dec. 16, 2003

(30) Foreign Application Priority Data

Dec. 26, 2002 (KR) ..... 10-2002-0084478

(51) Int. Cl.
*H04B 7/02* (2006.01)
(52) U.S. Cl. ..... 375/267
(58) Field of Classification Search ..... 375/267, 375/130, 347, 299; 455/101, 132; 348/607
See application file for complete search history.

(56) References Cited

U.S. PATENT DOCUMENTS

| | | | | |
|---|---|---|---|---|
| 4,679,227 | A | 7/1987 | Hughes-Hartogs | |
| 6,097,771 | A | 8/2000 | Foschini | |
| 6,317,466 | B1 | 11/2001 | Foschini et al. | |
| 7,120,199 | B2 * | 10/2006 | Thielecke et al. | 375/267 |
| 7,480,341 | B2 * | 1/2009 | Jeong et al. | 375/267 |

FOREIGN PATENT DOCUMENTS

| | | |
|---|---|---|
| KR | 98-13075 | 4/1998 |

OTHER PUBLICATIONS

G.G. Raleigh et al.; "Spatio-Temporal Coding For Wireless Communications"; 0-7803-3336-5/96 IEEE (pp. 1809-1814).
Cheong Yui Wong et al.; "Multiuser OFDM With Adaptive Subcarrier, Bit and Power Allocation"; IEEE Journal on Selected Areas in Comm., vol. 17, No. 10, Oct. 1999; pp. 1747-1758.
Ka-Wai Ng, et al.; "A Simplified Bit Allocation . . . Fading Channels"; 0-7803-7400-2/2/02 IEEE (pp. 411-415).
Ka-Wai Ng, et al.; "Iterative Bit & Power . . . Fading Channel"; 0-7803-7376-6/02/02 IEEE (pp. 271-275).
P.W. Wolniansky, et al.; "V-Blast: An Architecture . . . Wireless Channel"; 0-7803-4900-8/98 IEEE (pp. 295-300).

* cited by examiner

*Primary Examiner* — Khai Tran
(74) *Attorney, Agent, or Firm* — NSIP Law

(57) ABSTRACT

An apparatus for adaptively modulating/demodulating signals in a multi-input multi-output (MIMO) system having a layered time-space architecture detector and a method thereof is disclosed. The apparatus includes: a bit and power allocation information calculator for deciding an equivalent channel gain in a reverse order of Vertical-Bell laboratories Space Time (V-BLAST) based on MIMO channel information feedbacked from a receiver and determining the number of bits and transmission power to be transmitted to each transmitting antenna by using the equivalent channel gain; and adaptive modulation means for modulating signal of each layer with corresponding modulation method based on the determined number of bits and transmitting power, controlling the transmitting power and transmitting the adaptively modulated signal through each transmitting antenna. The present invention can improve performance without increase of implementation complexity and easily expand to MIMO-OFDM system by adaptively modulating and demodulating signals in reverse order of conventional V-BLAST detection method.

35 Claims, 8 Drawing Sheets

FIG. 2

$$H = \begin{bmatrix} 1.2 & 0.5 & 1.5 \\ 1.5 & 1.0 & 0.4 \\ 1.3 & 0.2 & 1.2 \end{bmatrix}$$

ORDER FOR V-BLAST

| | FIRST LAYER | SECOND LAYER | THIRD LAYER |
|---|---|---|---|
| $\lVert w_k \rVert^2$ | 4.789 | 7.941 | 2.163 |
| THIRD LAYER NULLING | | | |
| $\lVert w_k \rVert^2$ | 0.941 | 3.925 | X |
| SECOND LAYER NULLING | | | |
| $\lVert w_k \rVert^2$ | X | 0.775 | X |
| FINAL EQUIVALENT CHANNEL GAIN | | | |
| $1/\lVert w_k \rVert^2$ | 1.063 | 1.290 | 0.462 |

RANDOM ORDER

| | FIRST LAYER | SECOND LAYER | THIRD LAYER |
|---|---|---|---|
| $\lVert w_k \rVert^2$ | 4.789 | 7.941 | 2.163 |
| FIRST LAYER NULLING | | | |
| $\lVert w_k \rVert^2$ | X | 1.269 | 0.425 |
| SECOND LAYER NULLING | | | |
| $\lVert w_k \rVert^2$ | X | X | 0.260 |
| FINAL EQUIVALENT CHANNEL GAIN | | | |
| $1/\lVert w_k \rVert^2$ | 0.209 | 0.788 | 3.846 |

REVERSE ORDER FOR V-BLAST

| | FIRST LAYER | SECOND LAYER | THIRD LAYER |
|---|---|---|---|
| $\lVert w_k \rVert^2$ | 4.789 | 7.941 | 2.163 |
| SECOND LAYER NULLING | | | |
| $\lVert w_k \rVert^2$ | 0.765 | X | 1.069 |
| THIRD LAYER NULLING | | | |
| $\lVert w_k \rVert^2$ | 0.185 | X | X |
| FINAL EQUIVALENT CHANNEL GAIN | | | |
| $1/\lVert w_k \rVert^2$ | 5.405 | 0.126 | 0.935 |

APPARATUS AND METHOD FOR ADAPTIVELY MODULATING SIGNAL BY USING LAYERED TIME-SPACE DETECTOR USED IN MIMO SYSTEM

Matter enclosed in heavy brackets [ ] appears in the original patent but forms no part of this reissue specification; matter printed in italics indicates the additions made by reissue.

FIELD OF THE INVENTION

The present invention relates to an apparatus for modulating/demodulating signal by using a layered time-space architecture detector in a multi-input multi-output (MIMO) system and a method thereof; and, more particularly, to the apparatus for modulating/demodulating signal by using a layered time-space architecture detector in a multi-input multi-output (MIMO) system in order to increase a system performance by deciding an equivalent channel gain, deciding the number of bits for transmitting through each antenna and deciding a transmission power by using the a greedy algorithm based on the decided equivalent channel gain.

DESCRIPTION OF RELATED ARTS

Generally, a multi-input multi-output (MIMO) system is a wireless communication system obtaining high frequency efficiency by transmitting each different data through a plurality of transmission antennas in an identical bandwidth. There have been several detection methods for MIMO systems, such as a Diagonal Bell Laboratories Space Time (D-BLAST) system proposed in an article by G. J. Foschini, entitled "Layered Space-Time Architecture for Wireless Communication in a Fading Environment When using Multi-Element Antennas," Bell Labs Technical Journal, fall, pp. 41~59, 1999 and a Vertical-Bell Laboratories Space Time (V-BLAST) system introduced in an article by P. W. Wolniansky et.al., entitled "V-Blast: An Architecture for Realizing Very High Data Rates Over the Rich-Scattering Wireless Channel." Proc. International Symposium Signals, Systems and Electronics, September, 1998.

The V-BLAST system is a modified scheme of the D-BLAST system.

Operations of detection in the V-BLAST system are explained in more detail hereinafter. At first, a symbol corresponding to a layer having the largest equivalent channel gain is detected based on a MIMO channel matrix and new channel matrix is built by nulling a channel corresponding to the currently detected layer after canceling the effect of the detected symbol in the channel matrix H. And the above mentioned steps are repeated until all symbols are detected. As a result of these operations, a layer having largest equivalent channel gain is detected for the first time. When the next symbol is detected, the effect of the first symbol is eliminated because it is considered as interference and then the next symbol is detected. Therefore, a diversity gain can be obtained when the next symbol is detected and a performance is increased.

In a meantime, a structure of V-BLAST system is in U.S. Pat. No. 6,317,466 B1 issued to G. J. Foschini, entitled "Wireless Communications System Having a Space-Time Architecture Employing Multi-Element antenna at both the Transmitter and Receiver" and also an adaptive modulation method is disclosed. But in the above mentioned patent by G. J. Foschini, a method for minimizing transmission power and changing modulation method commonly used for all antennas.

Furthermore, a greedy algorithm for allocating power and the number of bits in multicarrier systems is introduced in an article by C. Y. Wong, entitled "Multi-user OFDM with adaptive sub-carrier, bit and power allocation", IEEE Journal on Selected Areas in Communication, Vol. 17, pp. 1747~1758, October, 1999. The greedy algorithm is used for calculating a power and the number of bits of each subcarrier in order to transmit all information bits with the minimum transmission power while satisfying desired bit error rate under conditions such as single user orthogonal frequency division multiplexing (OFDM) is used, a frequency domain channel response corresponding to each subcarrier is known at the transmitter, the number of bits for transmitting at one OFDM symbol is predetermined and there is a desired bit error rate.

There are two methods implementing the MIMO-OFDM system with the adaptive modulation method. A first method is introduced in an article by Ka-Wai Ng. et. al., entitled "A simplified bit allocation for V-BLAST based OFDM MIMO system in frequency selective fading channels" IEEE international conference on communication, pp. 411~415, 2002. A second method is disclosed in an article by Ka-wai Ng et. al., entitled "Iterative bit & power allocation for V-BLAST based OFDM MIMO system in frequency selective fading channel", Proc. Wireless Communications and Networking Conference, 2002, pp. 271~275.

The first method calculates the equivalent channel gain based on an ordering method of the V-BLAST and decides the number of bits according to the greedy algorithm based on the calculated equivalent channel. It is also disclosed that a method of selecting a subcarrier and transmitting antenna in order to reduce the amount of information transmitted to the transmitter. The above mentioned approaches using the V-BLAST ordering method may obtain nearly same performance for all layers when fixed modulation method is used. However, the performance is degraded in a case of an adaptive modulation is used.

The second method allocates a predetermined number of bits to all possible combinations of decision order for the optimal solution and selects the optimal order with minimum total transmission power. However, by reducing the number of combinations to be considered for finding the optimal solution, the performance is degraded.

SUMMARY OF THE INVENTION

It is, therefore, an object of the present invention to provide an apparatus for adaptively modulating/demodulating signal by using a layered time-space architecture detector in a multi-input multi-output (MIMO) system for improving a system performance by deciding an equivalent channel gain, deciding the number of bits for transmitting through each antenna and a transmission power by using a greedy algorithm based on the decided equivalent channel gain.

In accordance with an aspect of the present invention, there is provided an apparatus for adaptively modulating signal in a MIMO system having a layered space-time architecture based detector, the apparatus including: a bit and power allocation information calculator for deciding an equivalent channel gain-in a reverse order of Vertical-Bell laboratories Space Time (V-BLAST) based on MIMO channel information feedbacked from a receiver and determining the number of bits and transmission power to be transmitted from each transmitting antenna by using the equivalent channel gain; and adaptive modulation means for modulating signal of each layer with corresponding modulation method based on the determined number of bits and transmitting power.

In accordance with an aspect of the present invention, there is provided an apparatus for adaptively demodulating signal in a MIMO system having a layered space-time architecture based detector, the apparatus including: MIMO channel estimation unit for estimating MIMO channel from a signal received through each receiving antenna; a bit and power allocation information calculator for determining an equivalent channel gain in reverse order of Vertical-Bell laboratories Space Time V-BLAST based on MIMO channel information from the MIMO channel estimation unit and determining the number of bits corresponding to each transmitting antenna by using the equivalent channel gain.

In accordance with an aspect of the present invention, there is provided apparatus for adaptively modulating and demodulating signals in MIMO system using multiple antennas at transmitter and receiver, the apparatus including: an adaptive modulation unit for adaptively modulating signals in order to transmit the modulated signal after determining an equivalent channel gain in a reverse order of a vertical-bell laboratories space time and determining the number of bits and transmitting power based on the determined equivalent channel gain; and adaptive demodulation unit for detecting and adaptively demodulating received signals through each receiving antenna in reverse order of V-BLAST.

In accordance with an aspect of the present invention, there is provided a method for adaptively modulating signals in a MIMO system using multiple antennas in a receiver and transmitter, the method, including the steps of: a) determining equivalent channel gain in a reverse order of V-BLAST at transmitter based on channel information feed backed from the receivers; and b) adaptively modulating signals by determining the number of bits and corresponding transmitting power to be transmitted through each layer (antenna) by using the equivalent channel gain in a greedy algorithm.

In accordance with an aspect of the present invention, there is provided a method for adaptively demodulating in MIMO systems, the method including the steps of: a) estimating a channel from a signal received at each receiving antenna; b) deciding an equivalent channel gain in a reverse order of a vertical-bell laboratories space time (V-BLAST) based on the channel information; and c) detecting and adaptively demodulating the received signal using the adaptive modulation information for each layer.

In accordance with an aspect of the present invention, there is provided a computer readable recoding medium storing instructions for executing a method for an adaptive modulation, the method including the steps of: a) at a transmitter, deciding an equivalent channel gain in a reverse order of V-BLAST based on a feedback information from a receiver; and b) at the transmitter, deciding the number of bit transmitting through each layer (transmitting antenna) and transmitting power based on the equivalent channel gain computed at the step a).

In accordance with an aspect of the present invention, there is provided a computer readable recoding medium storing instructions for executing a method for an adaptive demodulation, the method including the steps of: a) estimating a channel from a signal received from each receiving antenna; b) deciding an equivalent channel gain in a reverse order of V-BLAST based on the channel information; and c) detecting and adaptively demodulating by deciding the number bits for each layer.

BRIEF DESCRIPTION OF THE DRAWING(S)

The above and other objects and features of the present invention will become apparent from the following description of the preferred embodiments given in conjunction with the accompanying drawings, in which:

FIG. 2 is a view showing changing of equivalent channel gain according to the detection order in layered space-time architecture in accordance with the present invention;

Figure 7:
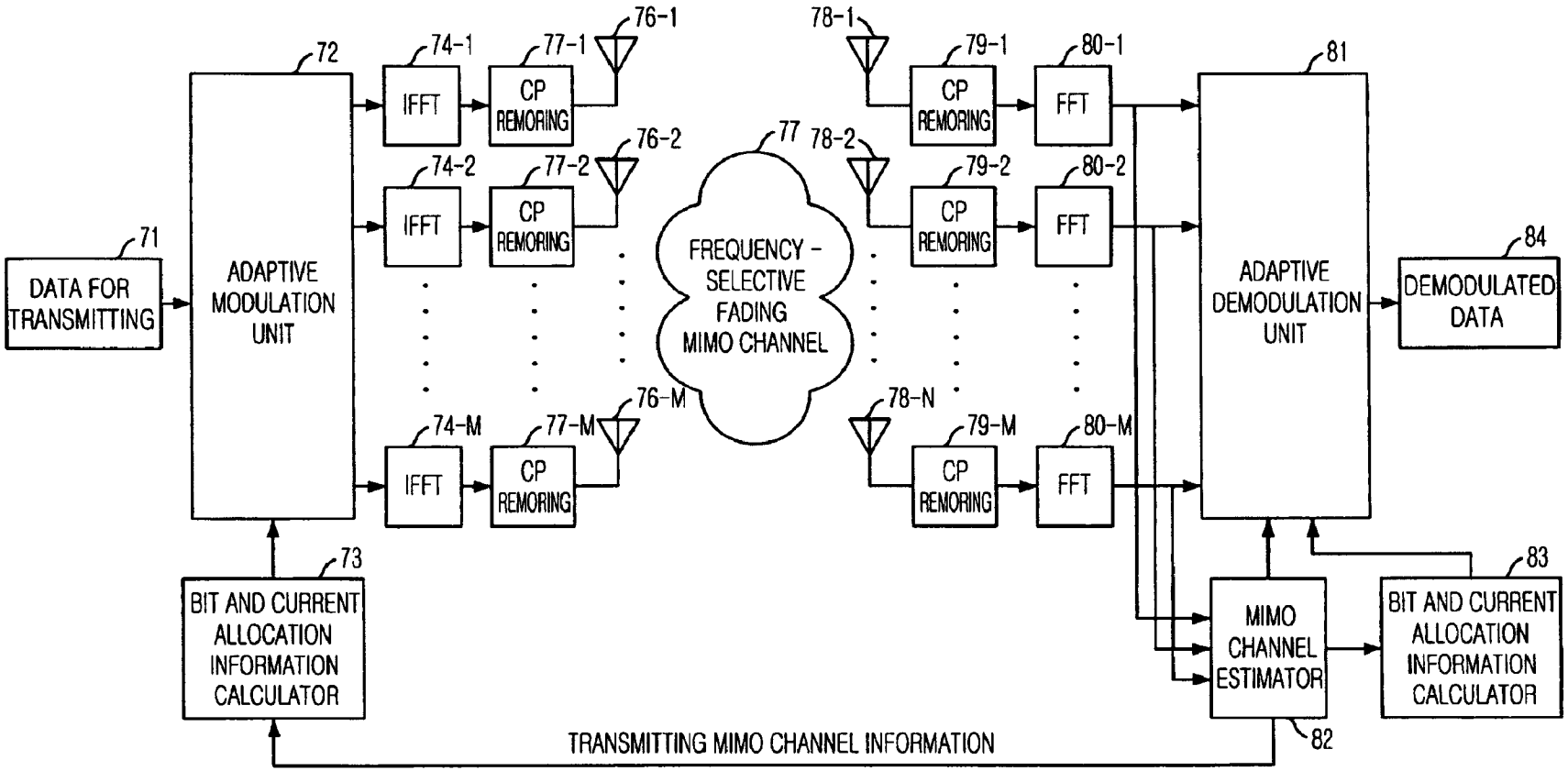
Figure 8:
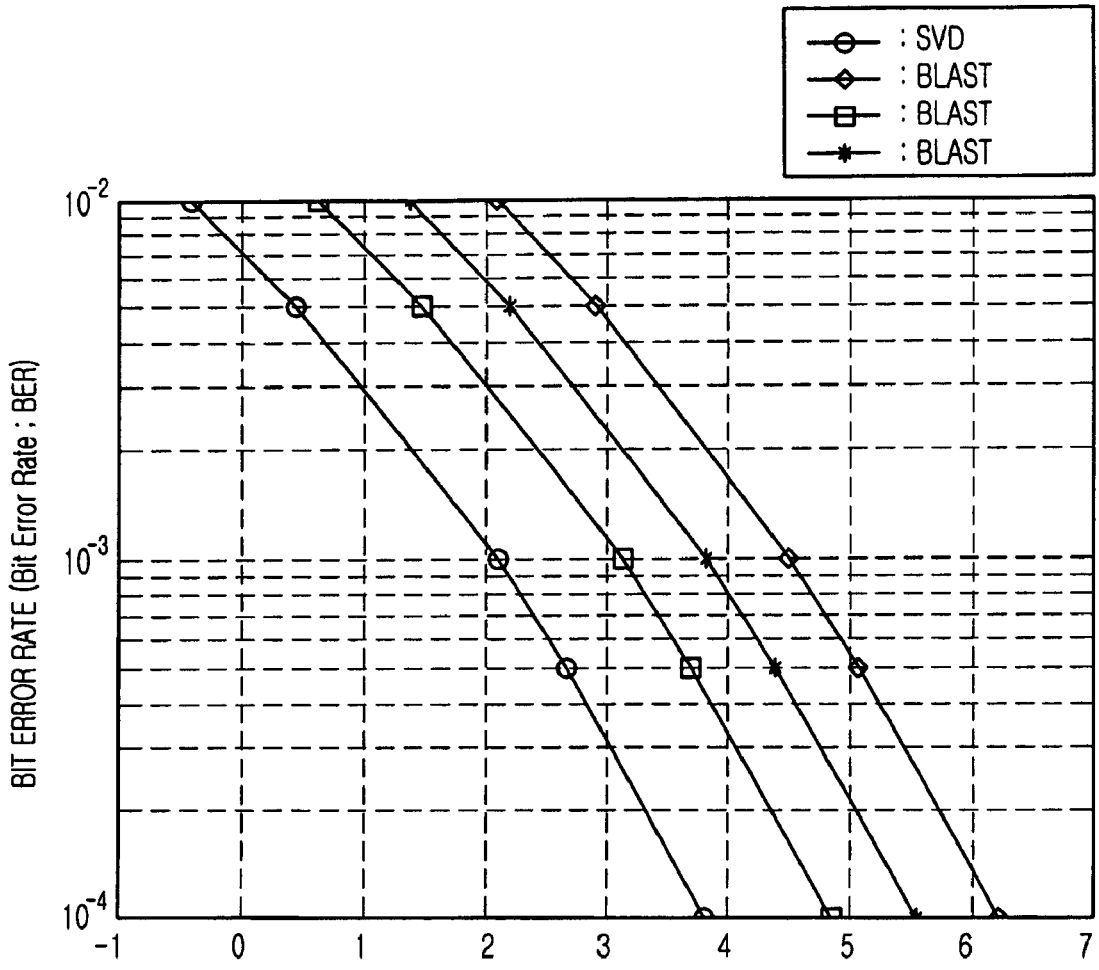

FIG. 7 is a diagram showing an apparatus for adaptively modulating/demodulating signals in MIMO OFDM wireless communication system having V-BLAST type detector in accordance with a preferred embodiment of the present invention; and FIG. 8 is a graph showing a result of a simulation of a method for adaptively modulating/demodulating signal in MIMO OFDM wireless system having V-BLAST type detector in accordance with a preferred embodiment of the present invention.

DETAILED DESCRIPTION OF THE INVENTION

Other objects and aspects of the invention will become apparent from the following description of the embodiments with reference to the accompanying drawings, which is set forth hereinafter.

For helping to understand the present invention, a greedy algorithm used in an adaptive modulation/demodulation method in accordance with the present invention is explained at first.

For explaining the greedy algorithm, an orthogonal frequency division multiplexing method is used as an example.

At first, the transmission power of the $n^{th}$ subcarrier of, $P_n$, is given as:

$$P_n = \frac{f(C_n)}{|h_n|^2} \qquad \text{Eq. 1}$$

In the Eq. 1, $h_n$ is a channel gain of the $n^{th}$ subcarrier, $C_n$ is the number of bit for transmitting with the subcarrier, and $f(C_n)$ is a is a transmission power for transmitting c bits with desired bit error rate (BER).

In a meantime, if an entire bits for transmitting one of OFDM symbol is R, a bit allocation method for minimizing a sum of transmission power of entire subcarrier can be expressed as:

$$P_t = \min_{c_x \in D} \sum_{n=1}^{N_c} \frac{1}{|h_n|^2} f(C_n) \quad \text{Eq. 2}$$

subject to $$R = \sum_{n=1}^{N_c} c_n$$

In the Eq. 2, Nc is the number of total subcarriers, D represents a set of information bits per subcarrier determined by modulation/demodulation methods. For example, if a QPSK, 16-QAM, 64-QAM and so on can be selected for the modulation/demodulation methods, then D={0, 2, 4, 6, 8, . . . }. In here, 0 means that no information is sent in the corresponding subcarrier.

The Eq. 2 can be solved by the greedy algorithm through following steps.

step 1: For all subcarriers, we define $c_n$=0, $$\Delta P_n = \frac{f(\Delta B)}{|h_n|^2}.$$

step 2: following equations 3, 4 and 5 are repeatedly operated until the condition $$R = \sum_{n=1}^{N_c} c_n$$

is satified.

$$\hat{n} = \underset{n}{\operatorname{argmin}} P_n \quad \text{Eq. 3}$$

$$C_n = C_n + \Delta B \quad \text{Eq. 4}$$

$$\Delta P_n = \frac{f(C_n + \Delta B) - f(C_n)}{|h_n|^2} \quad \text{Eq. 5}$$

In the Eqs. 4 and 5, Δβ is the difference of elements of set D e.g., D={0, 2, 4, 6, . . . }. Therefore, Δβ=2.

step 3: after completing step 2, each $C_n$ is determined and $P_n$ is calculated by using eq. 1.

Finally, the number of bits allocated to each subcarrier, $C_n$, and the transmission power, $P_n$, is determined.

In the V-BLAST detection method, data transmitted from a plurality of transmitting antenna is detected as one by one and the detected symbols are cancelled for reducing interference to other signals. The next symbol is detected after canceling the channel effect corresponding to the previously detected symbol. Therefore, the equivalent channel gain is varied according to an order of nulling. The present invention provides a method for achieving performance gain by adaptively modulating the signal with an equivalent channel gain obtained by the reverse order of conventional V-BLAST detection order. Hereinafter, the V-BLAST detection method is explained at first.

Figure 1:
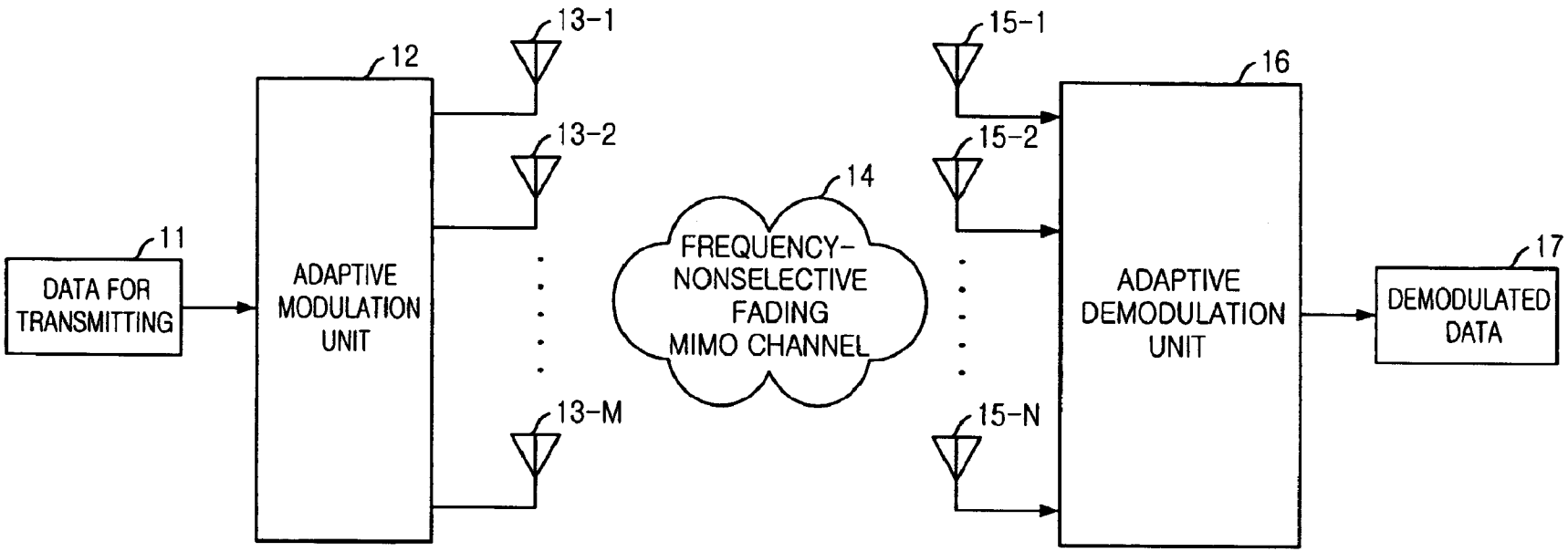
FIG. 1 is a diagram for illustrating a MIMO wireless communication system having a layered space-time architecture detector in accordance with a preferred embodiment of the present invention.

FIG. 1 is diagram for illustrating a MIMQ wireless communication system having a layered space-time architecture detector in accordance with a preferred embodiment of the present invention.

Referring to FIG. 1, in the MIMO wireless communication system having a detector of V-BLAST structure, a signal vector transmitted from each transmission antenna 13-1, 13-2, . . . , 13-M is defined as $x=[x_0, x_1, \ldots, x_{M-1}]^T$ and a signal vector received to each receiving antenna 15-1, 15-2, . . . 15-N is defined as $y=[y_0, y_1, \ldots, y_{N-1}]^T$. M and N is the number of transmitting/receiving antennas and it is satisfied with a condition, N≧M. The received signal vector is expressed as:

$$y=Hx+v \quad \text{Eq. 6}$$

In the Eq. 6, H is N×M channel matrix, the element of the $n^{th}$ row and, a $m^{th}$ column, $h_{n,m}$, is a flat fading channel gain between $m^{th}$ transmitting antenna and $n^{th}$ receiving antenna. In a meantime, v is a N×1 white noise vector with zero mean and its covariance matrix is $E[vv^H]=\sigma^2 I$. I is N×N unit matrix.

For detection of the transmitting signal vector x from the receiving signal vector y, the V-BLAST detection method is used. A nulling vector for $k^{th}$ layer ($k^{th}$ transmission antenna signal) is defined as:

$$w_k^T(H)_l = \delta_{kl} = \begin{cases} 1, & k = 1 \\ 0, & k \neq 1 \end{cases} \quad \text{Eq. 7}$$

In the Eq. 7, $(H)_t$ is $1^{th}$ column of matrix H and $W_k^T$ is a $k^{th}$ column of a pseudo-inverse matrix $H^+$. A detection order is determined by considering a value of $w_k$. In the conventional V-BLAST detection, a column of the matrix having smallest value of $\|w_k\|$ is detected at first. In a meantime, $Z_k$ is a decision statistic of $k^{th}$ layer and it is expressed as:

$$Z_k=x_k+w_k^T v \quad \text{Eq. 8}$$

In the Eq. 8, k={1, 2, . . . , M}. After determining the signal by considering the decision statistic $Z_k$, an interference of the previous detected signal is cancelled and the channel matrix H is updated. That is, new channel matrix H is generated by setting $k^{th}$ column of prior matrix H as '0'. New received signal vector y' is determined as:

$$y'=y-(H)_k x_k \quad \text{Eq. 9}$$

In the Eq. 9, $x_k$ is a result of decision of $Z_k$. The Eqs. 6 to 9 are repeatedly executed for calculating a nulling vector by using new channel matrix H' and receiving signal vector y' until all signals are detected. The above mentioned steps are detection steps of conventional V-BLAST. Order of detection is determined according to the magnitude of norm of nulling vector.

If the eq. 7 is used for calculating a signal-to-noise ratio of the decision statistics, $\rho_k$, which is calculated as:

$$\rho_k = \frac{E\{|x_k|^2\}}{\sigma^2 \|w_k\|^2} \quad \text{Eq. 10}$$

In the, Eq. 10, E{ } is an expectation function and $\|w_k\|^2$ is the equivalent channel gain. Therefore, a state of channel is better as $\|_k\|$ is getting smaller. The V-BLAST method for MIMO system using a fixed modulation/demodulation method detects a layer of best channel state at first and then detects a layer of worse channel state after eliminating interference of signals, which have already been detected in order to enhance performance of all layers.

However, the adaptive modulation/demodulation method detects a layer of best channel state later and information of a layer of worse channel is not transmitted or less amount of information is transmitted in order to enhance the performance. Therefore, the detection order must to be reversed for enhancing the performance in accordance with the present invention.

Figure 5:
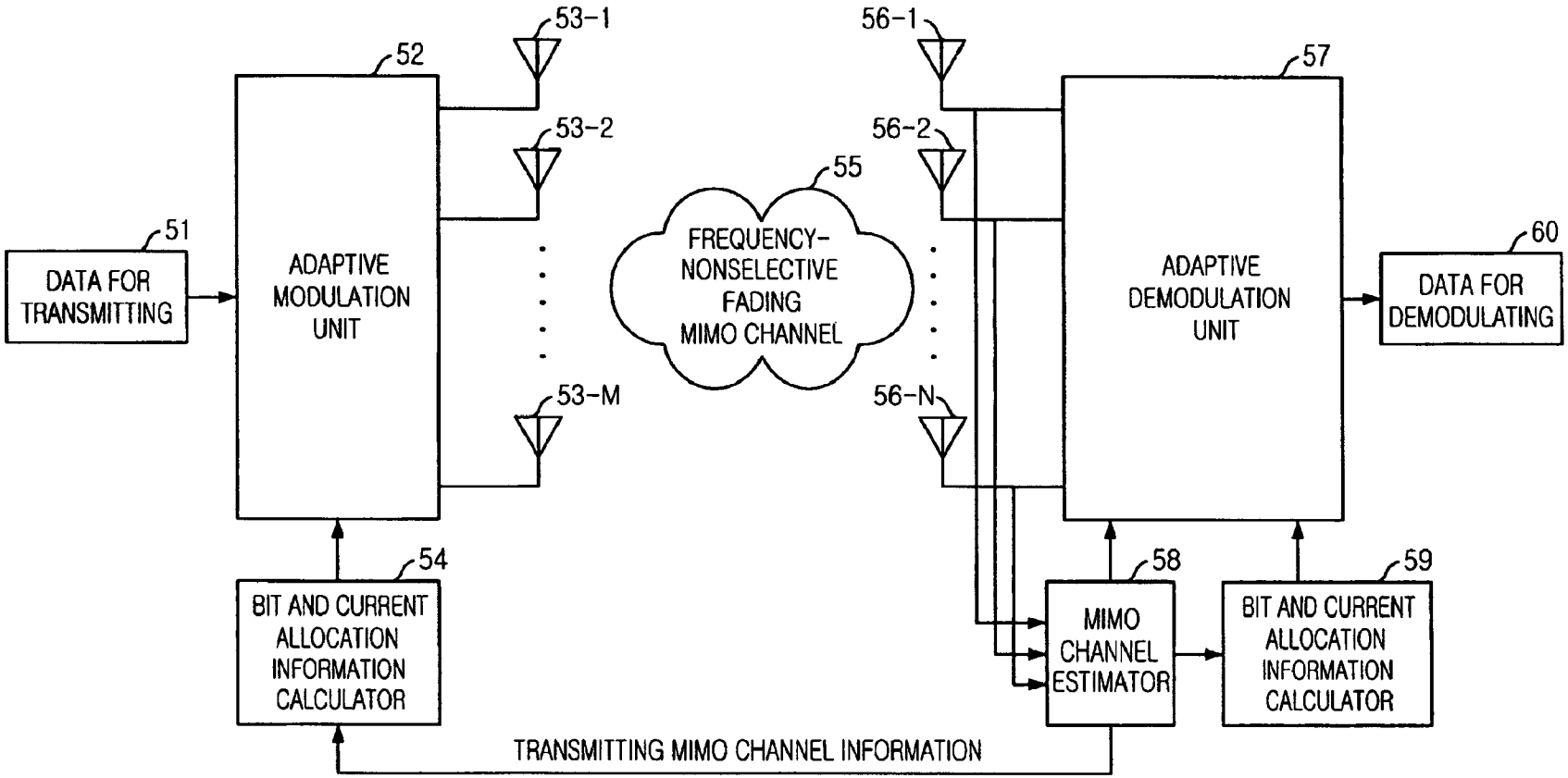
FIG. 5 is a diagram showing an apparatus for adaptively modulating/demodulating signal in the MIMO wireless communication system having layered space-time architecture in accordance with a preferred embodiment of the present invention.

FIG. 5 is a diagram showing an adaptive modulation/demodulation, and in the MIMO wireless communication system with V-BLAST type in accordance with a preferred embodiment of the present invention.

Referring to FIG. 5, a MIMO system having V-BLAST detector includes an adaptive modulation unit 52 and an adaptive demodulation unit 57 for modulating/demodulating signals with using different demodulation/modulation method and controlling transmission power of the signal. The demodulation unit 57 includes a V-BLAST type detection unit.

Operations of the adaptive modulation/demodulation units 52 and 57 are explained in detail as followings.

A transmitting data 51 is data transmitted from a transmitter. If necessary, this date would be scrambled, channel coded, and interleaved. The adaptive modulation unit receives the channel information and controls transmitting power by modulating the data with different modulation methods according to each layer by using bit and power allocation information.

When adaptively modulated signals are transmitted through M transmitting antennas 53-1 to 53-M, a bit and power allocation information calculator 54 determines the number of bits and transmitting power to be transmitted to each transmitting antennas 53-1 to 53-M by using MIMO channel information feedbacked from a receivers and the greedy algorithm.

Through the above mentioned operations, signals transmitted from the M transmitting antennas 53-1 to 53-M are transmitted to N receiving antennas 56-1 to 56-N through frequency non-selective fading MIMO channel. And the adaptive demodulation unit 57 demodulates the received signals by using channel estimation result from a MIMO channel estimator 58 and a bit allocate information from the bit allocation information calculator 59 in reverse order of V-BLAST. Finally, the demodulated signal is outputted.

FIG. 2 is a view showing changing of equivalent channel gain according to an order of nulling in a layered space-time architecture in accordance with the present invention.

Referring to FIG. 2, although identical channel matrix is used, the equivalent channel gain is changed according to an order of detection such as an order of V-BLAST, a random order and a reverse order of V-BLAST. Thus, in case of detection according to the order of V-BLAST, a deviation of the equivalent channel gain is small and the sum of equivalent channel gain is small. And in case of detecting according to the reverse order of V-BLAST, the deviation and sum of the equivalent channel gain become larger.

A method for determining the equivalent channel gain in a reverse order of the V-BLAST detection method in accordance with a preferred embodiment of the present invention is explained in detail.

Figure 3:
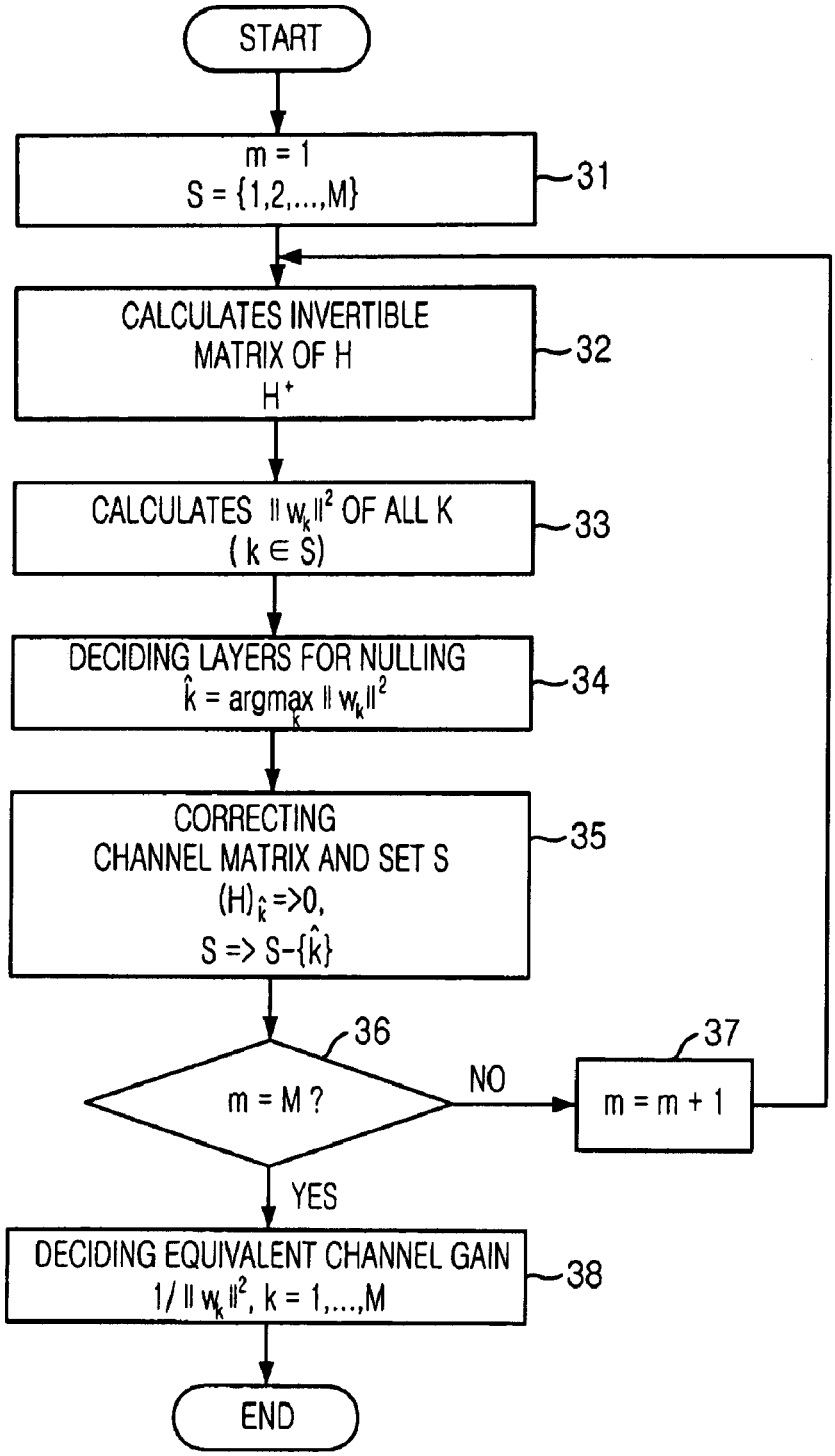
FIG. 3 is a flowchart for explaining a method for determining the equivalent channel gain in a reverse order of the V-BLAST detection method.

FIG. 3 is a flowchart for explaining the method for determining the equivalent channel gain in a reverse order of the V-BLAST detection method.

Referring to FIG. 3, at step 31, an antenna index set is defined ($S=\{1, 2, \ldots, M\}$) because of determining an order of detection for determining the equivalent channel gain. An pseudo-inverse Matrix of channel matrix $H^+$ is calculated at step 32. At step 33, all nulling vectors $w_k^T$, $k \epsilon S$, are calculated based on the Eq. 7 for calculating transmitting signal vector x.

After the step 33, square root of a norm of nulling vector is calculated for determining a layer for nulling and $k^{th}$ layer having the largest value is selected at step 34. A column of the channel matrix corresponding to the selected $k^{th}$ layer is transformed to 0 vector and a value k is eliminated from the set S at step 35. The above mentioned steps are repeated M times with newly transformed set S and channel matrix H.

As mentioned above, an order of the selected layers becomes a detection order and an inverse of square root norm of the nulling vector for the selected layer becomes the equivalent channel gain. Furthermore, the number of bits transmitted at each layer (transmitting antenna) and corresponding transmitting power is calculated by using the calculated equivalent channel gain instead of subcarrier channel gain $\|h_n\|^{12}$ in greedy algorithm.

Figure 4:
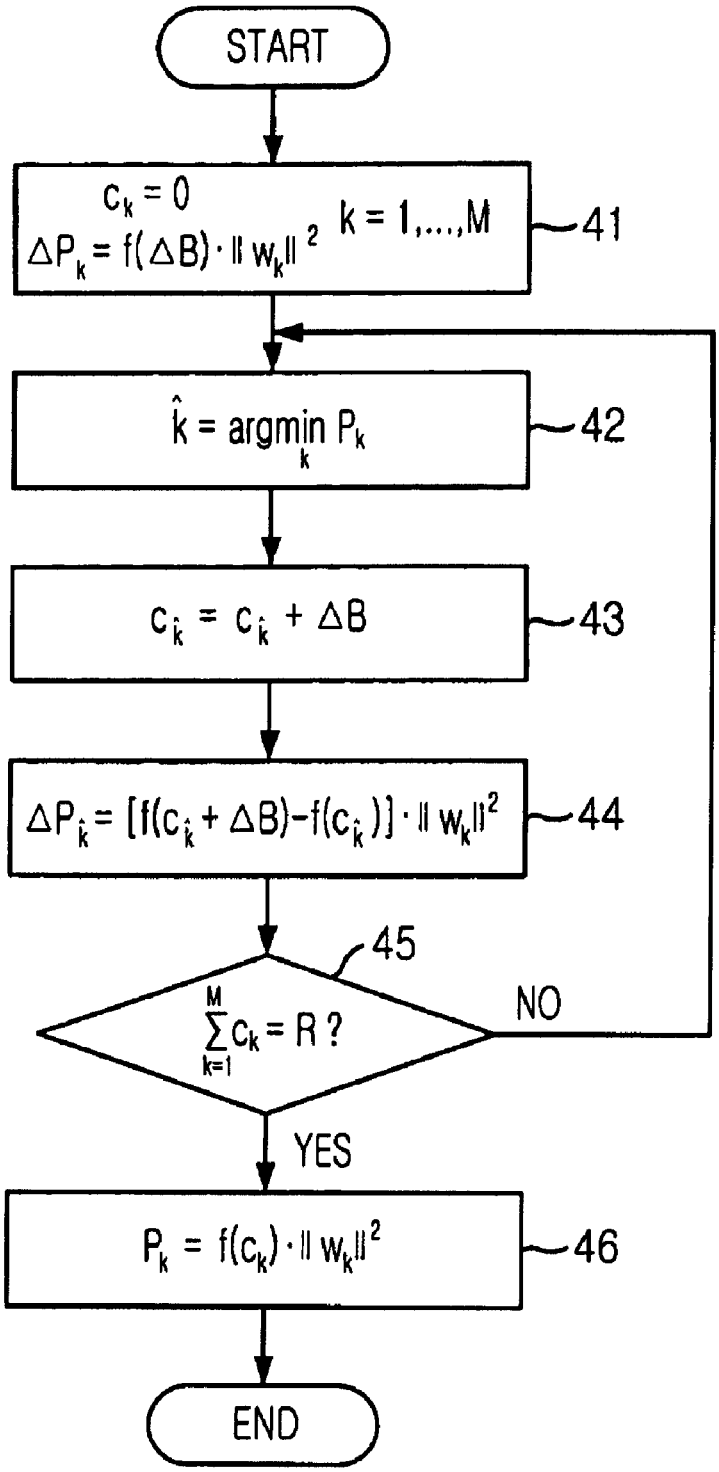
FIG. 4 is a flowchart for explaining steps for determining the number of bits for transmitting of each transmitting antenna and corresponding transmitting power by using a equivalent channel gain according to greedy algorithm in accordance with a preferred embodiment.

FIG. 4 is a flowchart for explaining steps for determining the number of bits for transmitting of each transmitting antenna and corresponding transmitting power by using a equivalent channel gain according to greedy algorithm in accordance with a preferred embodiment of the present invention.

Referring to FIG. 4, at step 41, the number of bits transmitted at each layer (each transmitting antenna) is initialized as '0'. $\Delta\beta$ is defined based on the Eq. 2 and a transmitting power is calculated for obtaining an additional bit value of $\Delta\beta$ with desired bit error rate at each layer by using the equivalent channel gain of each layer. Among the calculated layers, a layer requiring the least transmitting power is selected and the value of $\Delta\beta$ is putted to the selected layer. The above mentioned steps are repeatedly performed until allocated total bit number is assigned. After determining the number of bits transmitted through each layer, a transmitting power of each layer is calculated based on the Eq. 1.

Figure 6:
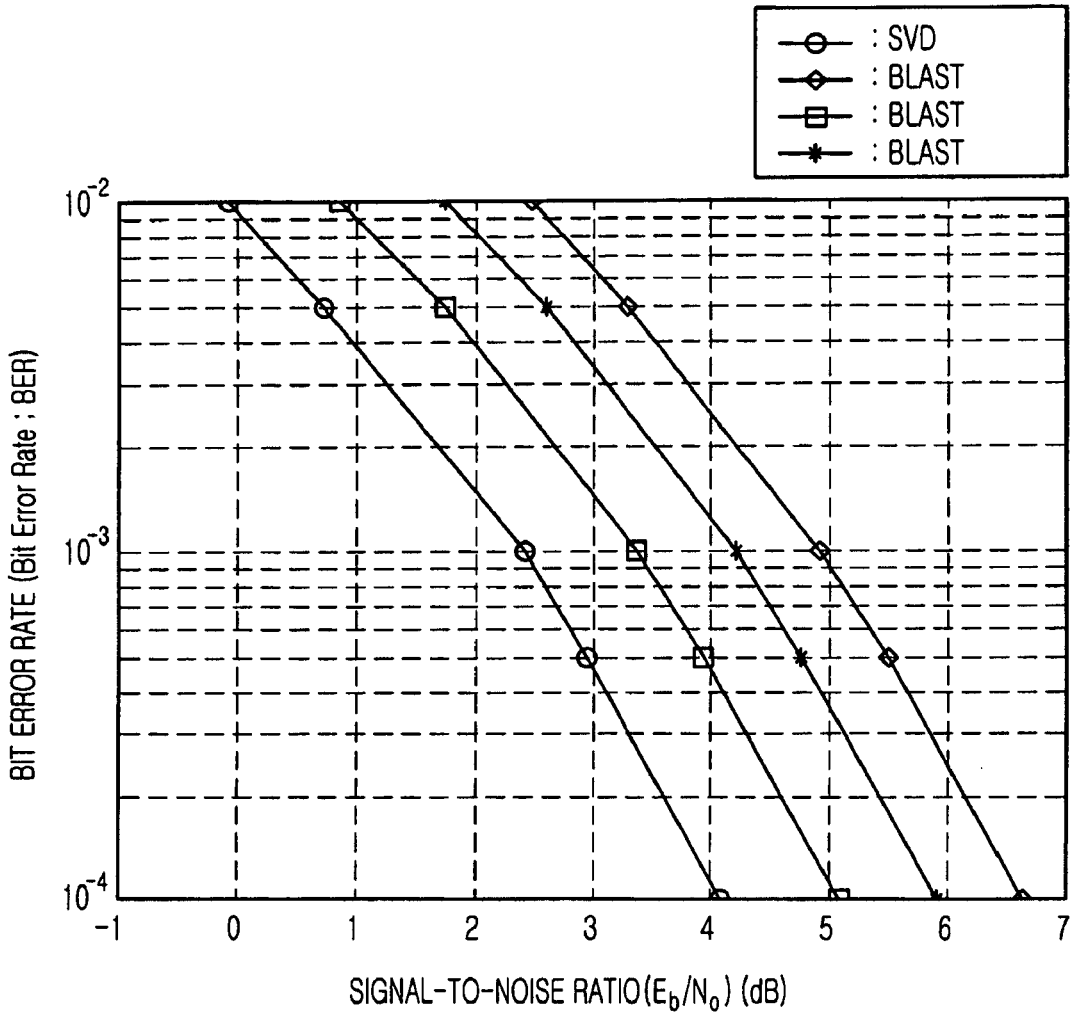
FIG. 6 is a graph showing a performance of a method for adaptively modulating/demodulating signals in a MIMO wireless communication system having V-BLAST type detector in accordance with a preferred embodiment of the present invention.

FIG. 6 is a graph showing a performance of an adaptive modulation/demodulation method of a MIMO wireless communication system with V-BLAST type detector in accordance with a preferred embodiment of the present invention. The graph shows result of simulation for comparing performance of a conventional modulation/demodulation method and the modulation/demodulation method in accordance with the present invention.

In the simulation, the number of transmitting and receiving antennas is 4 and a channel of each transmitting and receiving antenna is a complex Gaussian random variable with zero mean. For preventing to limit performance by influence of specific channel matrix, more than 1000 statistic channels are generated. The number of information bits for transmitting in a predetermined time is set to 8 and QPSK and 16-QAM are used for modulation method. Thus, $D=\{0, 2, 4\}$ and therefore, $\Delta\beta$ is 2.

In the simulation, a system performance of a conventional modulation/demodulation method implemented by using greed algorithm with singular value decomposition (SVD), which is known as the optimal solution in the adaptive modulation MIMO system is used for a lower bound for comparison. The conventional modulation/demodulation method is introduced by G. G Raleigh et. al., in "spatio-temporal coding for wireless communication" at Proc. IEEE Globecom, November, 1996, pp. 1809-1814 and it has too complicated structure. Thus, it is impossible to be implemented to real system.

Referring to the FIG. 6, SVD is a result of the conventional modulation/demodulation method, BLAST is a result of using V-BLAST detection order introduced by Ka-wai Ng and BLAST(random order) is a result of using random detection order. BLAST(reverse) is a result of using reverse order of the V-BLAST detection order.

As shown in FIG. 6, the present invention has 0.7 bB performance gain and 1 dB performance loss in comparison with Ka-wai Ng's method and the conventional modulation/demodulation method proposed by Raleigh.

FIG. 7 is a diagram showing an adaptive modulation/demodulation apparatus of MIMO OFDM wireless communication system with V-BLAST type detector in accordance with a preferred embodiment of the present invention.

Referring to FIG. 7, an adaptive modulation MIMO system of the present invention can be expanded to the MIMO OFDM system. It is because a channel matrix H of the MIMO system can be replaced with a channel matrix in each subcarrier of MIMO-OFDM system. There are two methods implemented to the MIMO OFDM system.

A first method is a method for implementing adaptive modulation method to all layers M and all subcarriers $N_c$. At first, an equivalent channel gain is independently calculated according to a layer of each transmitting antenna and subcarrier. The equivalent channel gain is calculated according to the method in FIG. 4 as much as the number of layers of the transmitting antenna times the number of subcarriers. Finally, $N_c \times R$ number of information bits and transmitting power is allocated according to the greedy algorithm introduced in FIG. 4 by using the obtained $N_c \times R$ number of equivalent channel gains.

Therefore, when total data rate is determined in the MIMO-OFDM transmitter, the number of information bits and corresponding transmitting power can be determined by using the equivalent channel gain obtained by the greedy algorithm in FIG. 4 for allocating data bits to total antennas and subcarriers. Inhere, a value of M in FIG. 4 is a value of N becomes $N_c \times M$. However, the first method is very complicated to be implemented in real system because of large number of comparison and equivalent channel gain calculation in the greedy algorithm.

A second method is a method for adaptively modulating signal per each subcarrier, independently. That is, if total data rate is predetermined in MIMO-OFDM system and the identical data bits are allocated to each sub carrier wave, the data bits must be allocated by obtaining the equivalent channel gain of each subcarrier. In this case, the number of the equivalent channel gain is M per each subcarrier. The data bits are allocated by using the greedy algorithm in FIG. 4 in M layers. Thus, Nc times of greedy algorithm are performed and the repetition number is decreased. The second method can be simply implemented comparing to the first method but its performance is decreased compared with the first method.

The bit and power allocation information calculator 73 allocates the data bits by using the channel matrix H of each subcarrier delivered by the MIMO channel estimation unit 82 and the transmission power is also allocated to each transmitting antennas 76-1 to 76-M by using the equivalent channel gain of each subcarrier.

The adaptive modulation unit based on V-BLAST type detector performs modulation operations using bits and power allocated to each transmitting antenna 76-1 to 76-M per each subcarrier.

For demodulating a received signal at the MIMO OFDM system, bits and transmitting power is known. Therefore, in the MIMO channel estimator 82 at a receiver, a channel matrix H of each subcarrier is estimated and performs operations for obtaining bits and power information using the greedy algorithm. The V-BLAST detection and adaptive demodulation unit 81 demodulates a signal using bit allocation information.

FIG. 8 is a graph showing a result of a simulation of an adaptive modulation/demodulation method of MIMO OFDM wireless system with V-BLAST type detector in accordance with a preferred embodiment of the present invention.

Referring to FIG. 8, the simulation is progressed by using 4 transmitting and receiving antennas, 64 subcarriers and 16 cyclic prefixes are used for OFDM modulation. An exponentially decaying quasi-static fading channel having 8 taps is used.

The method as mentioned above can be implemented as a program and can be stored in a computer readable recording medium such as CD-ROM, RAM, ROM, Floppy disk. Hard disk and optical magnetic disk.

The present invention can improve performance above 0.7~1.4dB performance gain comparing to conventional modulation method with random and V-BLAST detection orders without increase of implementation complexity.

While the present invention has been described with respect to certain preferred embodiments, it will be apparent to those skilled in the art that various changes and modifications may be made without departing from the scope of the invention as defined in the following claims.

What is claimed is:

1. An apparatus for adaptively modulating signal in a MIMO system having a layered space-time architecture based detector, the apparatus comprising:

a bit and power allocation information calculator for deciding an equivalent channel gain in a reverse order of Vertical-Bell laboratories Space Time (V-BLAST) based on MIMO channel information feedbacked from a receiver and determining the number of bits and transmission power to be transmitted to each transmitting antenna by using the equivalent channel gain; and adaptive modulation mean for modulating signal of each layer with corresponding modulation method based on the determined number of bits, controlling the transmitting power and transmitting the adaptively modulated signal through each transmitting antenna.

2. The apparatus as recited in claim 1, wherein the transmitter detects and modulates signals in a reverse order of a V-BLAST.

3. The apparatus as recited in claim 1, wherein the receiver transmits identical adaptive modulation information with the modulation method and transmitting power instead of feedbacking the MIMO channel information.

4. The apparatus as recited in claim 1, wherein the bit and power allocation information calculation mean determines an equivalent channel gain in the reverse order of V-BLAST and calculates the number of bit information and corresponding transmitting power at each layer by using the equivalent channel gain in a greedy algorithm instead of using channel gain.

5. An apparatus for adaptively demodulating signal in a MIMQ system having a layered space-time architecture based detector, the apparatus comprising:

MIMO channel estimation means for estimating MIMO channel from a signal received through each receiving antenna;

a bit and power allocation information calculator for determining an equivalent channel gain in reverse order of Vertical-Bell laboratories Space Time (V-BLAST) based on MIMO channel information from the MIMO channel estimation means and determining the number of bits to be transmitted from each transmitting antenna by using the equivalent channel gain; and adaptive demodulation means for demodulating signal of each layer with corresponding modulation method based on the determined number of bits and the MIMO channel information.

6. An apparatus for adaptively modulating and demodulating signals in MIMO system using multiple antennas at transmitter and receivers, the apparatus comprising: an adaptive modulation means for adaptively modulating signals in order to transmit the modulated signal after determining an equivalent channel gain in a reverse order of a vertical-bell laboratories space time and determining the number of bits and transmitting power based on the determined equivalent channel gain; and adaptive demodulation means for detecting and adaptively demodulating received signals in reverse order of V-BLAST.

7. The apparatus as recited in claim 6, wherein the adaptive demodulation means feedbacks the MIMO channel information to the modulation means or transmits identical adaptive modulation information including the modulation method and transmitting power instead of the MIMO channel information.

8. The apparatus as recited in claim 7, wherein the apparatus has (the number of subcarriers).times.(the number of transmission antennas) of equivalent channel gains and determines the number of bits and transmitting power to be transmitted through each transmission antennas in a MIMO-OFDM system having a layered space-time architecture detector.

9. The apparatus as recited in claim 6, wherein the apparatus independently detects and demodulates signals per each subcarrier by determining the number of bits and transmitting power to be transmitted through each transmitting antenna per each subcarrier in a MIMO OFDM system having a layered space-time architecture detector.

10. A method for adaptive modulating signals in a MIMO system using multiple antennas in a receiver and transmitter, the method comprising the steps of:

a) determining equivalent channel gain in a reverse order of V-BLAST at transmitter based on information feedbacked from the receivers; and b) adaptively modulating signals by determining the number of bits and corresponding transmitting power to be transmitted through each layer by using the equivalent channel gain in a greedy algorithm instead of using subcarrier.

11. The method as recited in claim 10, wherein the transmitter detects and modulates signals in a reverse order of a V-BLAST.

12. The method as recited in claim 11, wherein the step a) includes the steps of:

a-1) initializing an antenna index set;

a-2) nulling layers in an order of layer having a smallest equivalent channel gain and modifying the antenna index set or a channel matrix based on a result of nulling layers;

a-3) repeatedly performing the step a-2) as many as the number of antennas; and a-4) deciding the equivalent channel gain of each antenna layer based on a result of the step a-3).

13. The method as recited in the claim 12, wherein the step a-2) includes the steps of:

a-2-1) computing an pseudo-inverse matrix of channel matrix;

a-2-2) computing square root of norm of nulling vector for deciding a nulling layer;

a-2-3) selecting a layer having a biggest norm of nulling vectors among layers of computing results from the step a-2-2); and a-2-4) nulling the selected layer and eliminating the selected layer from the antenna index set.

14. The method as recited in claim 10, the step a) includes the steps of:

a-a) initializing an antenna index set;

a-b) nulling layers in an order of layer having a smallest equivalent channel gain and modifying the antenna index set or a channel matrix based on a result of nulling layers;

a-c) reputedly performing the step a-b) as many as the number of antennas;

a-d) deciding the equivalent channel gain of each antenna layer based on a result of the step a-c); and a-e) deciding the equivalent channel gain by reputedly performing the step a), the step b), the step a-a) and the step a-c).

15. The method as recited in the claim 14, the number of bit transmitting to each antenna and a transmitting power are decided by performing a greedy algorithm based on the decided equivalent channel gain computed from the step a-e) in the step b).

16. The method as recited in claim 10, wherein the step a), in a case there are preset data bits of the system and data bits allocated to each subcarrier are identical, includes the steps of:

a-I) initializing an antenna index set according to a subcarrier;

a-II) nulling layers in an order of layer having a smallest equivalent channel gain and modifying the antenna index set or a channel matrix based on a result of nulling layers for the subcarrier;

a-III) repeatedly performing the step a-II) as many as the number of antennas for the subcarrier; and a-IV) deciding the equivalent channel gain of each antenna layer based on a result of the step a-III).

17. The method as recited in claim 16, wherein the step a-II) includes the steps of:

a-II-1) performing a greedy algorithm from the equivalent channel gain decided to one of the subcarrier in the step of a-IV) and deciding the number of bits transmitting through an antenna according to the one of carrier waves and transmitting power; and a-II-2) deciding identical number of bits and transmitting power which are decided in the step a-II-1) for all other sub carrier waves.

18. A method for adaptively demodulating in a multi input and multi output system, the method comprising the steps of:

a) estimating a channel from a signal received at each receiving antenna;

b) deciding an equivalent channel gain in a reverse order of a vertical-bell laboratories space time (V-BLAST) based on the channel information; and c) detecting and adaptively demodulating by deciding the number of bits based on the equivalent channel gain.

19. A computer readable recoding medium storing instruction for executing a method for adaptive modulation, the method comprising the steps of:

a) at a transmitter, deciding an equivalent channel gain in a reverse order of V-BLAST based on a feedback information from a receiver; and b) at the transmitter, deciding the number of bit transmitting through each layer (transmitting antenna) and transmitting power based on the equivalent channel gain computed at the step a).

20. A computer readable recoding medium storing instructions for executing a method for adaptively demodulating signals, the method comprising the steps of:

a) estimating a channel from a signal received from each receiving antenna;

b) deciding an equivalent channel gain in a reverse order of V-BLAST based on the channel information; and c) detecting and adaptively demodulating by deciding the number bits transmitted from the each transmitting antenna based on the equivalent channel gain.

*21. An apparatus for adaptively modulating signal in a MIMO system, the apparatus comprising:*

*a bit and power allocation information calculator configured to determine an equivalent channel gain for each trasmitting antenna in a reverse order of a Vertical-Bell Laboratories Space Time (V-BLAST) and determine the number of bits and transmission power for each transmitting antenna by using the equivalent channel gain; and*

*an adaptive modulator configured to modulate a signal to be transmitted through each transmitting antenna based on the determined number of bits and transmit the modulated signal through each transmitting antenna at the determined transmission power.*

*22. The apparatus as recited in claim 21, wherein the bit and power allocation information calculator configured to determine the equivalent channel gain based on MIMO channel information feedbacked from a receiver.*

*23. An apparatus for adaptively demodulating signal in a MIMO system, the apparatus comprising:*

*a MIMO channel estimator configured to estimate a MIMO channel from a signal received through each receiving antenna;*

*a bit and power allocation information calculator configured to determine an equivalent channel gain for each receiving antenna in reverse order of a Vertical-Bell Laboratories Space Time (V-BLAST) and determine the number of bits for each receiving antenna by using the equivalent channel gain; and*

*an adaptive demodulator configured to demodulate the signal of each layer based on the determined number of bits.*

*24. The apparatus as recited in claim 23, wherein the bit and power allocation information calculator configured to determine the equivalent channel gain based on MIMO channel information from each transmitting antenna.*

*25. A system for adaptively modulating and demodulating signals in MIMO system, the system comprising:*

*an adaptive modulator configured to modulate signals to be transmitted through each transmitting antenna after determining an equivalent channel gain in a reverse order of a Vertical- Bell Laboratories Space Time (V-BLAST) and determine the number of bits based on the determined equivalent channel gain; and*

*an adaptive demodulator configured to detect and demodulate received signals in reverse order of V-BLAST.*

*26. A method for adaptively modulating signals in a MIMO system, the method comprising the steps of:*

*determining an equivalent channel gain for each transmitting antenna in a reverse order of a Vertical-Bell Laboratories Space Time (V-BLAST); and*

*adaptively modulating signals by determining the number of bits to be transmitted through each transmitting antenna based on the equivalent channel gain in a greedy algorithm.*

*27. The method as recited in claim 26, wherein the equivalent channel gain is determined based on MIMO channel information feedbacked from a receiver.*

*28. The method as recited in claim 26, wherein the step of determining the equivalent channel gain comprises steps of:*

*initializing an antenna index set;*

*nulling layers in an order of layer having a smallest equivalent channel gain and modifying the antenna index set or a channel matrix based on a result of nulling layers; and*

*deciding the equivalent channel gain of each antenna layer based on a result of nulling.*

*29. The method as recited in the claim 28, wherein the step of nulling comprises steps of:*

*computing an pseudo-inverse matrix of channel matrix;*

*computing square root of norm of nulling vector for deciding a nulling layer;*

*selecting a layer having a biggest norm of nulling vectors among layers of computing results from the step of computing square root of norm of nulling vector for deciding a nulling laye; and*

*nulling the selected layer and eliminating the selected layer from the antenna index set.*

*30. A method for adaptively demodulating in a MIMO system, the method comprising the steps of:*

*estimating a channel from a signal received through each receiving antenna;*

*determining an equivalent channel gain for each receiving antenna in a reverse order of a Vertical-Bell Laboratories Space Time (V-BLAST); and*

*adaptively demodulating the received signals by deciding the number of bits based on the equivalent channel gain.*

*31. The method as recited in claim 30, wherein the equivalent channel gain is determined based on MIMO channel information.*

*32. A computer readable recoding medium storing instruction for executing a method for adaptive modulation, the method comprising the steps of:*

*determining an equivalent channel gain for each transmitting antenna in a reverse order of V-BLAST; and*

*determining a number of bit to be transmitted through each transmitted antenna based on the equivalent channel gain.*

*33. The computer readable recoding medium as recited in claim 32, wherein the equivalent channel gain is determined based on on MIMO channel information feedbacked from a receiver.*

*34. A computer readable recoding medium storing instructions for executing a method for adaptively demodulating signals, the method comprising the steps of:*

*estimating a channel from a signal received through each receiving antenna;*

*determining an equivalent channel gain for each receiving antenna in a reverse order of V-BLAST; and*

*adaptively demodulating the receiving signals by deciding number of bits based on the equivalent channel gain.*

*35. The computer readable recoding medium as recited in claim 34, wherein the equivalent channel gain based on MIMO channel information from each transmitting antenna.*

* * * * *